United States Patent
Saitoh

(10) Patent No.: US 7,360,109 B2
(45) Date of Patent: Apr. 15, 2008

(54) MEASURING THE INTERVAL OF A SIGNAL USING A COUNTER AND PROVIDING THE VALUE TO A PROCESSOR

(75) Inventor: Hiroshi Saitoh, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 421 days.

(21) Appl. No.: 11/085,035

(22) Filed: Mar. 22, 2005

(65) Prior Publication Data
US 2005/0262372 A1    Nov. 24, 2005

(30) Foreign Application Priority Data
May 19, 2004    (JP)    ............................ 2004-148491

(51) Int. Cl.
*G06F 1/00* (2006.01)
(52) U.S. Cl. .................... 713/502; 713/400; 713/500; 713/501
(58) Field of Classification Search ................ 713/400, 713/500, 501, 502; 710/48
See application file for complete search history.

(56) References Cited

U.S. PATENT DOCUMENTS

| | | | | |
|---|---|---|---|---|
| 4,538,235 | A | * | 8/1985 | Henning ..................... 702/176 |
| 5,218,693 | A | * | 6/1993 | Ogita ......................... 713/502 |
| 5,631,592 | A | * | 5/1997 | Schwarz et al. ............ 327/172 |
| 5,703,919 | A | * | 12/1997 | Bailey et al. ............... 377/16 |
| 6,058,487 | A | * | 5/2000 | Isoda ......................... 713/502 |
| 6,397,272 | B1 | * | 5/2002 | Horiguchi .................. 710/48 |
| 7,188,268 | B2 | * | 3/2007 | Vandenberg et al. ....... 713/400 |

FOREIGN PATENT DOCUMENTS

JP    07-260845 A    10/1995

\* cited by examiner

*Primary Examiner*—Thomas Lee
*Assistant Examiner*—Jaweed A Abbaszadeh
(74) *Attorney, Agent, or Firm*—Rabin & Berdo, P.C.

(57) ABSTRACT

The present invention aims to be capable of properly measuring the cycle of an external signal even where a timer clock and a CPU clock are operated asynchronously. A timer circuit comprises a timer counter which counts a generation interval of an external signal in sync with the timer clock, a first timer register which fetches therein a counted value of the timer counter in sync with the timer clock, a second timer register which fetches therein the value of the first timer register in sync with the CPU clock, an edge detection circuit which detects a change in the level of the external signal to thereby generate an edge detection signal, and a reload control circuit which outputs a first reload control signal for reloading the count value of the timer counter into the first timer register in sync with the timer clock in accordance with the edge detection signal, and outputs a second reload control signal for reloading the value of the first timer register fetched therein by the first reload control signal into the second timer register in sync with the CPU clock, and which holds the output of the second reload control signal where the next edge detection signal is generated during the interval from after the generation of a first edge detection, the CPU reads the contents of the second timer register, and outputs the second reload control signal after the CPU has read the contents of the second timer register.

4 Claims, 10 Drawing Sheets

MEASURING THE INTERVAL OF A SIGNAL USING A COUNTER AND PROVIDING THE VALUE TO A PROCESSOR

BACKGROUND OF THE INVENTION

1. Field of the Invention

The present invention relates to a microcomputer with a timer built therein for measuring the interval of a capture signal.

2. Description of the Related Art

A microcomputer has input ports, a memory, a CPU, etc. Various functions can be realized by operation-controlling these circuits by software. Therefore, the microcomputer is used in a wide range of applications such as operation control on home appliances, vehicle engine control, etc.

Also the microcomputer has a timer built therein for controlling timings provided to operate its functions. As the timer circuit built in the microcomputer, there is known, for example, a capture timer (or called "input timer").

The capture timer has the function of measuring the interval of occurrence of an external input signal. When a change in the voltage level of the external input signal (capture signal),is detected in a state in which a timer counter is being operated, the value of the timer counter is fetched into a timer register. Computing processing is performed using the timer register value and the timer register value updated according to a change in the voltage level of a next-generated external input signal, thereby making it possible to measure the interval of occurrence of the corresponding external input signal.

FIG. 7 is a configurational diagram of a conventional capture timer. The capture timer includes a timer counter 101, a timer register 102, an edge detection circuit 103, and an interrupt register 104 used as a status register. Incidentally, the edge detection circuit 103 is capable of performing three types of detections such as detection of the falling edge, detection of the rising edge and detection of both rising and falling edges. The capture timer 100 is provided with a register for controlling start/stop of the timer counter 101 in accordance with an operation given from a CPU, and a register used as a status register, which indicates the presence or absence of occurrence of OVF of the timer counter (not shown in the figure).

FIG. 8 is a diagram for describing the operation of the capture timer 100. When an external input signal (CAP input) is inputted to the capture timer 100 while the timer counter 101 is in operation, the edge detection circuit 103 detects a change in the voltage level of the external input signal. On the basis of its detected signal, a timer counter value is fetched into the timer register 102 and at the same time an interrupt request signal is generated.

FIG. 9 shows detailed timing for the operation of the capture timer shown in FIG. 8. The CPU outputs a read signal to the capture timer 100 to process the value of the timer register 102. The capture timer 100 outputs the value of the timer register 102 to a bus on the basis of the read signal issued from the CPU.

Incidentally, even when the timing provided to output an edge detection signal and the read signal issued from the CPU are outputted simultaneously as shown in FIG. 10 in such a microcomputer that a CPU clock and a timer counter are operated with the same clock (or synchronous clock), a timer counter value prior to being updated by the edge detection signal is outputted to the corresponding bus, and an incorrect value under which at least a timer register is placed under change, is not outputted to the bus.

The above related art has been disclosed in, for example, Japanese Unexamined Patent Publication No. Hei 7(1995)-260845.

However, in such a microcomputer that the CPU clock and the timer counter clock are perfectly asynchronous, the timer counter 101, the timer register 102 and the edge detection circuit 103 are operated in a timer clock cycle, whereas the read signal from the CPU is generated in a CPU clock cycle. Therefore, there is a possibility that when the timing provided to output an edge detection signal and a signal read from the CPU happen to be outputted in the simultaneous vicinity as shown in FIG. 11, a value lying in the course of a change in timer register value due to the generation of a capture signal will be outputted. With this view, there was a possibility that the interval of a capture signal measured based on this value would be a false one.

SUMMARY OF THE INVENTION

The present invention has been made in view of the foregoing. It is therefore an object of the present invention to make it possible to properly measure the cycle of an external signal even when a timer clock and a CPU clock are operated asynchronously.

According to one aspect of the present invention, for achieving the above object, there is provided a microcomputer comprising:

a timer circuit built therein, which is operated in accordance with a timer clock signal asynchronous with a CPU clock signal for operating a CPU, the timer circuit including, a timer counter which counts a generation interval of an external signal in sync with the timer clock;

a first timer register which fetches therein a counted value of the timer counter in sync with the timer clock;

a second timer register which fetches therein the value of the first timer register in sync with the CPU clock;

an edge detection circuit which detects a change in the level of the external signal to thereby generate an edge detection signal; and a reload control circuit which outputs a first reload control signal for reloading the count value of the timer counter into the first timer register in sync with the timer clock in accordance with the edge detection signal, and outputs a second reload control signal for reloading the value of the first timer register fetched therein by the first reload control signal into the second timer register in sync with the CPU clock, and which holds the output of the second reload control signal where the next edge detection signal is generated during the interval from after the generation of a first edge detection, the CPU reads the contents of the second timer register, and outputs the second reload control signal after the CPU has read the contents of the second timer register.

According to the microcomputer of the present invention, a timer counter and a first timer register operated in sync with a timer clock, and a first interrupt register are provided in a timer circuit built therein. Further, a second timer register and a second interrupt register operated in sync with a CPU clock signal are provided therein. The contents of the first timer register are controlled so as to be prohibited from being reloaded into the second timer register until reading of the second timer register from a CPU is completed. Therefore, even when the timer clock and the CPU clock signal are operated in asynchronous form, a normal interval measurement on an external signal (capture signal) can be carried out without misreading the contents of the timer counter.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings. Incidentally, the size, shape and physical relationship of each constituent element in the figures are merely approximate illustrations to enable an understanding of the present invention.

Figure 1:
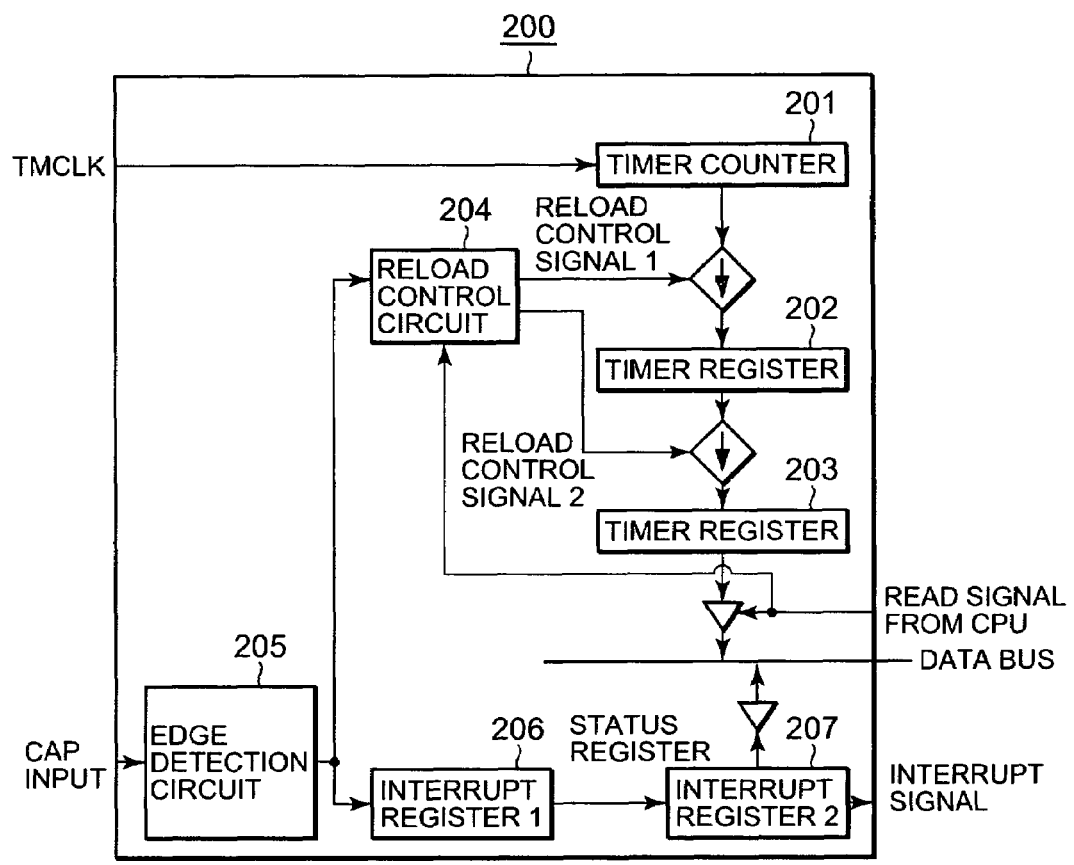
FIG. 1 is a block diagram of a capture timer according to a first embodiment.

FIG. 1 is a circuit diagram of a capture timer 200 showing a first embodiment of the present invention. The capture timer 200 is provided with a reload control circuit 204 inputted with a signal outputted from an edge detection circuit and a read signal sent from a CPU. A timer register is provided with a timer register 202 which takes in a timer count value in sync with a timer clock and a timer register 203 which captures therein the value of the timer register 202 in sync with a CPU clock. The CPU is configured so as to read the value of the timer register 203. When a second capture occurs during the interval from after a first capture occurs, the CPU reads the timer register 203, the timer register 202 is updated but the timer register 203 is not renewed.

An interrupt register also includes an interrupt register 206 which captures an edge detection signal in sync with the timer clock and an interrupt register 207 which takes in the value of the interrupt register 206 in sync with the CPU clock and generates an interrupt signal.

Figure 2:
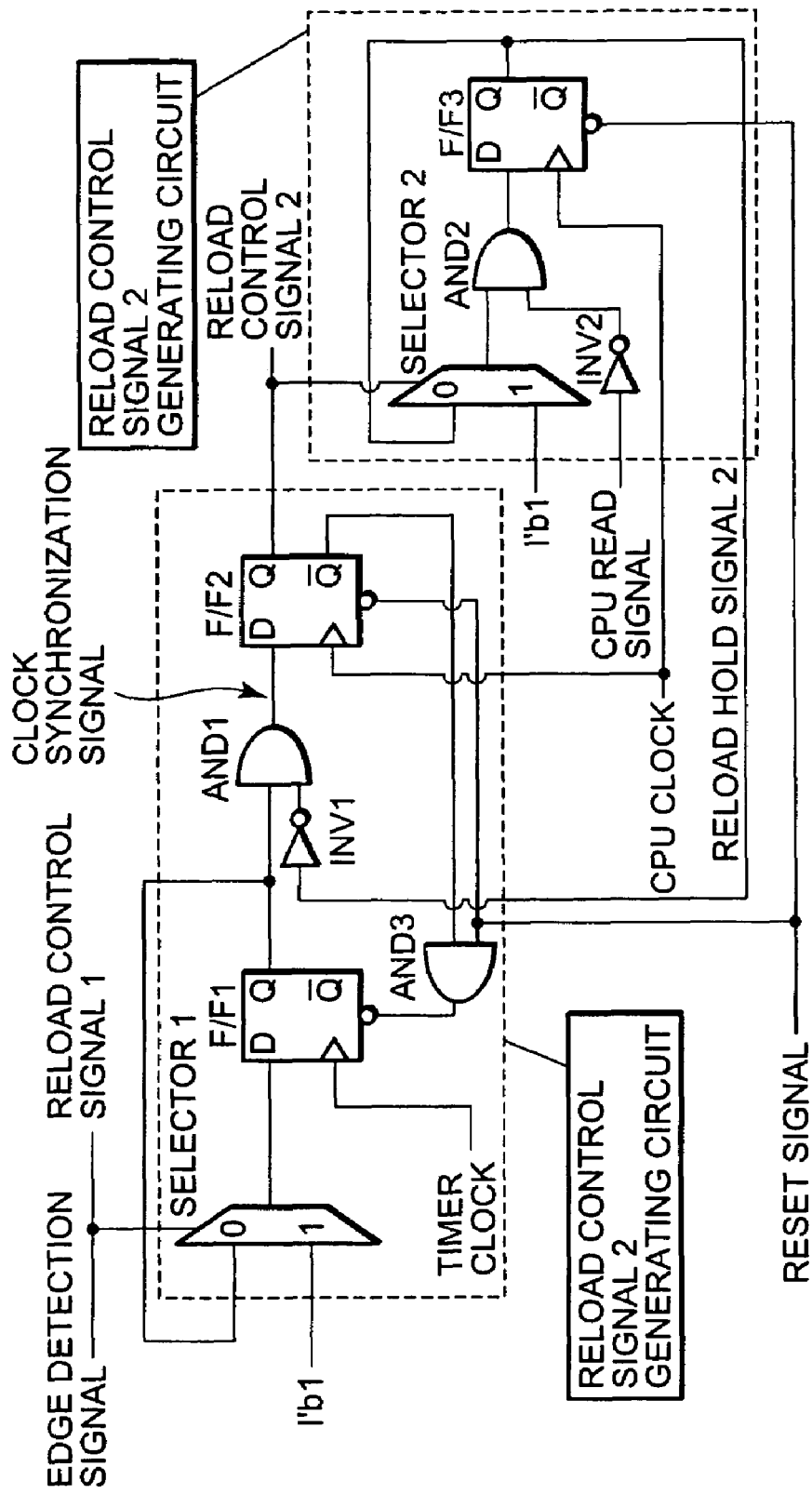
FIG. 2 is a circuit diagram showing one example of a configuration of a reload control circuit.

FIG. 2 is a circuit diagram showing internal circuits of the reload control circuit 204. The reload control circuit includes a reload control signal 2 generating circuit (comprising a selector 1, flip-flops (F/F1 and F/F2), an inverter (INV1) and AND circuits (AND1 and AND3)), and a reload hold signal 2 generating circuit (comprising a selector 2, a flip-flop (F/F3), an AND circuit (AND2) and an inverter (INV2)). Incidentally, flip-flops with reset for initialization (reset) are used for the respective F/Fs.

When a capture signal is inputted and an edge detection signal is generated, a reload control signal 1 is generated. In the reload control signal 2 generating circuit, when an edge detection signal is generated, the output of the F/F1 is brought to "1" in sync with a timer clock via a selector 1, so that the output (clock synchronization signal) of the AND1 is brought to "1". Then, the F/F2 captures therein the clock synchronization signal in sync with a CPU clock and brings a reload control signal 2 to "1". When the reload control signal 2 reaches "1", the output of the F/F1 is reset via the AND3 to reach "0", so that the clock synchronization signal is also brought to "0".

When the reload control signal 2 reaches "1" in the reload hold signal 2 generating circuit, the F/F3 brings a reload hold signal 2 to "1" in sync with the CPU clock via the selector 2. Thus, since the clock synchronization signal is brought to "0", the next capture (edge detection signal) is generated here. Since the clock synchronization signal remains at "0" even if the output of the F/F1 is taken as "1", no reload control signal 2 is generated (it does not reach "1").

When the reload hold signal 2 is placed in a state of "1" and a CPU read signal occurs ("1"), the output (reload hold signal 2) of the F/F3 is brought to "0" in sync with the CPU clock and the held clock synchronization signal is brought to "1", so that a reload control signal 2 is generated ("1").

Figure 3:
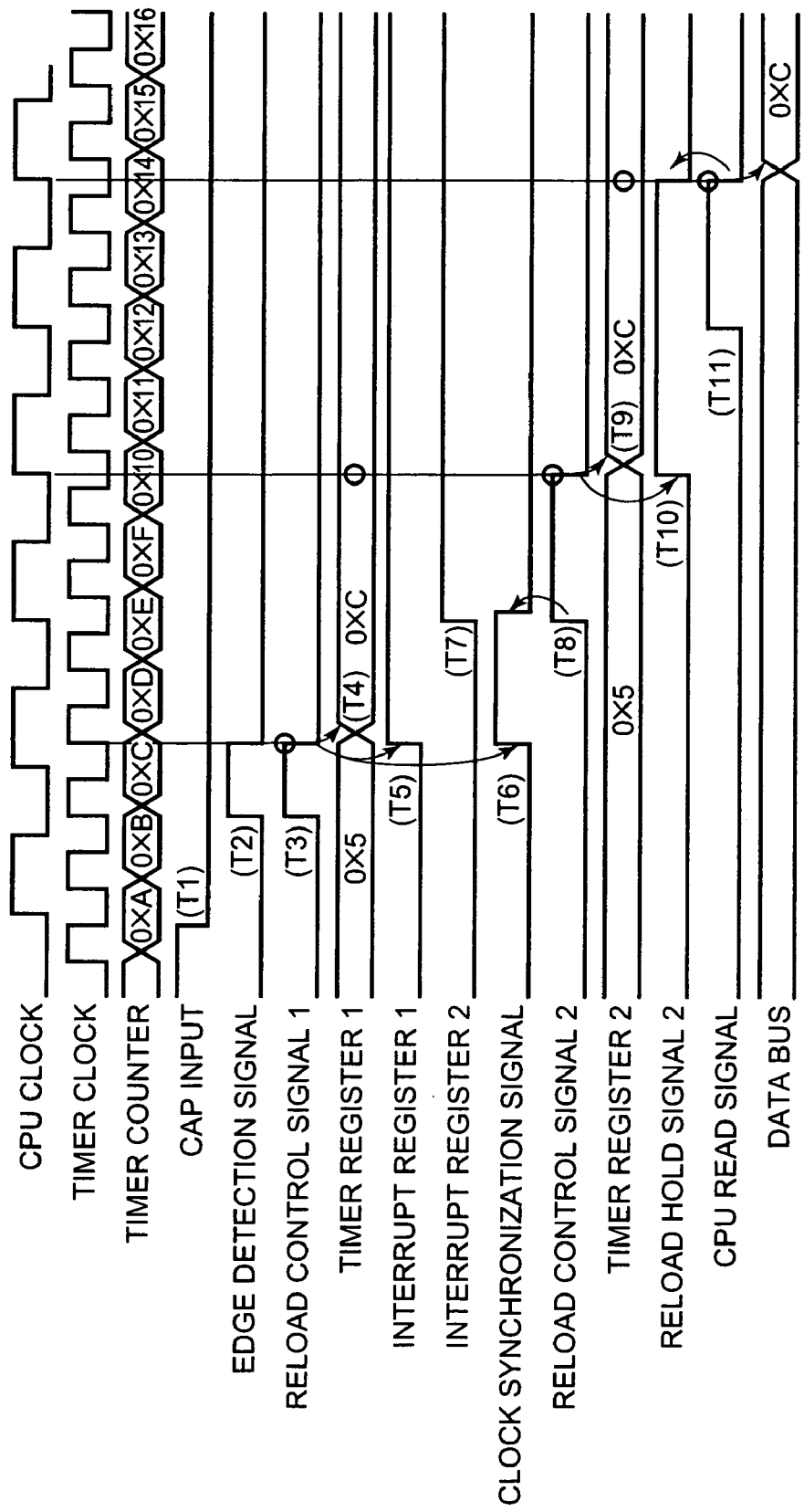
FIG. 3 is a time chart illustrating a basic operation of the capture timer according to the first embodiment.

FIG. 3 is a time chart showing a basic operation of the capture timer according to the first embodiment. The CPU clock and the timer clock CLK are perfectly defined as asynchronous clocks. The basic operation is as follows:

When a change in the level of a (T1) external input signal (CAP input) takes place, the edge detection circuit 205 generates a (T2) edge detection signal in sync with the timer clock. The reload control circuit 204 outputs a reload control signal 1 synchronized with the (T3) timer clock. When the reload control signal 1 occurs, the (T4) timer register 202 captures the value of the timer counter 201 in sync with the timer clock and at the same time the (T5) interrupt register 206 is set in sync with the timer CLK. Incidentally, an interrupt signal is fetched in the interrupt register 207 in sync with the (T7) CPU clock, from which an interrupt is notified to the CPU.

Since clock synchronization is required upon loading of data from the timer register 202 to the timer register 203, the reload control circuit 204 generates a (T6) clock synchronization signal in sync with the timer clock when a reload control signal 1 is generated. When the clock synchronization signal is set, a (T8) reload control signal 2 is generated in synchronism with the CPU clock. In accordance with this signal, the clock synchronization signal is reset and the value of the (T9) timer register 202 is fetched into the timer register 203 in sync with the next CPU clock, so that a reload hold signal 2 is set in sync with the CPU clock.

During a period in which the reload hold signal 2 is being set, the clock synchronization signal is held so long as a read signal from the CPU is not inputted, even though the capture next occurs. Thus, the value of the timer register 203 is not updated because no reload control signal 2 is generated. Then, the value of the timer register 203 is outputted to a data bus in accordance with the read signal sent from the (T11) CPU, and the reload hold signal 2 is cleared. Incidentally, if a second clock synchronization signal is being held with the occurrence of a second capture, the reload control signal 2 is cleared and thereafter it is released from its holding (set), whereby a reload control signal 2 is generated.

Figure 4:
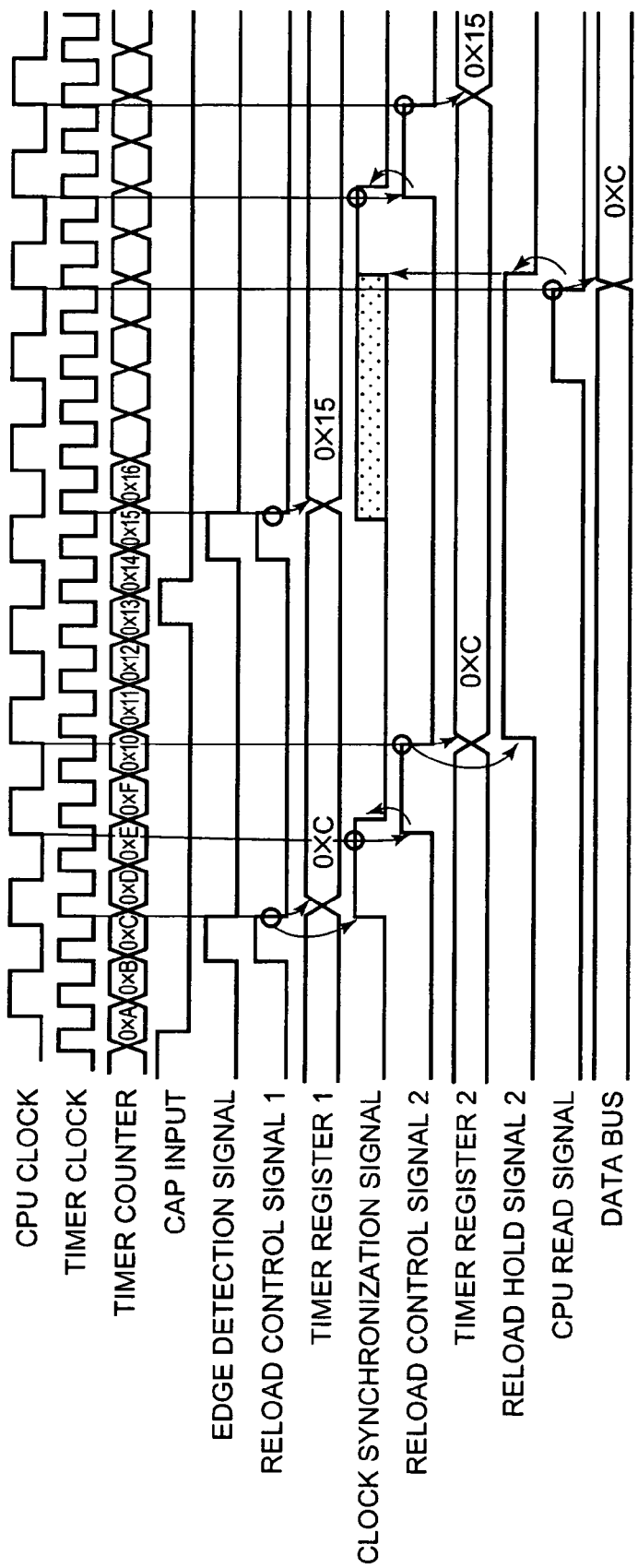
FIG. 4 is a time chart showing an example illustrative of cycle measurements of the capture timer according to the first embodiment.

FIG. 4 is a time chart showing an example illustrative of cycle measurements of an external signal (capture signal) employed in the first embodiment. Incidentally, the operations of the interrupt registers 206 and 207 are not shown in this figure.

When a second capture occurs before a read signal from the CPU is generated after a count value (O×C) is fetched into the timer register 202 with the generation of a first capture, a count value (O×15) is fetched into the timer register 202. Since, however, a reload hold signal 2 is already set and a clock synchronization signal is placed in a masked state, no second reload control signal 2 is generated and hence the timer register 203 is not updated.

After the CPU has read the count value "O×C" in accordance with the read signal, the reload hold signal 2 is cleared, and the masked clock synchronization signal is set so that the reload control signal 2 is generated, whereby the value (O×15) of the timer register 202 is taken in the timer register 203. The CPU performs an arithmetic operation using the value (O×C) read from the timer register 203 at the first capture and the value (O×15) of the timer register 203, which is obtained at the second capture, thereby to make it possible to measure a capture interval.

According to the first embodiment as described above, the CPU is capable of reading the correct timer register value properly without reading erroneous data upon reading the timer register value even in the microcomputer having the CPU clock and timer clock asynchronous owing to the provision of the timer register 202 for the timer clock and the timer register 203 for the CPU clock. Even though the second capture is generated, the reload control circuit 204 is operated such that the timer register 203 is not upgraded until the CPU reads the timer register 203. Further, even though the second capture is generated before the CPU reads the timer register 203, the value of the timer register 203 is read with the generation of the first capture and thereafter the value of the timer register 203 can be read with the generation of the second capture, thereby making it possible to measure the normal capture interval.

SECOND PREFERRED EMBODIMENT

Figure 5:
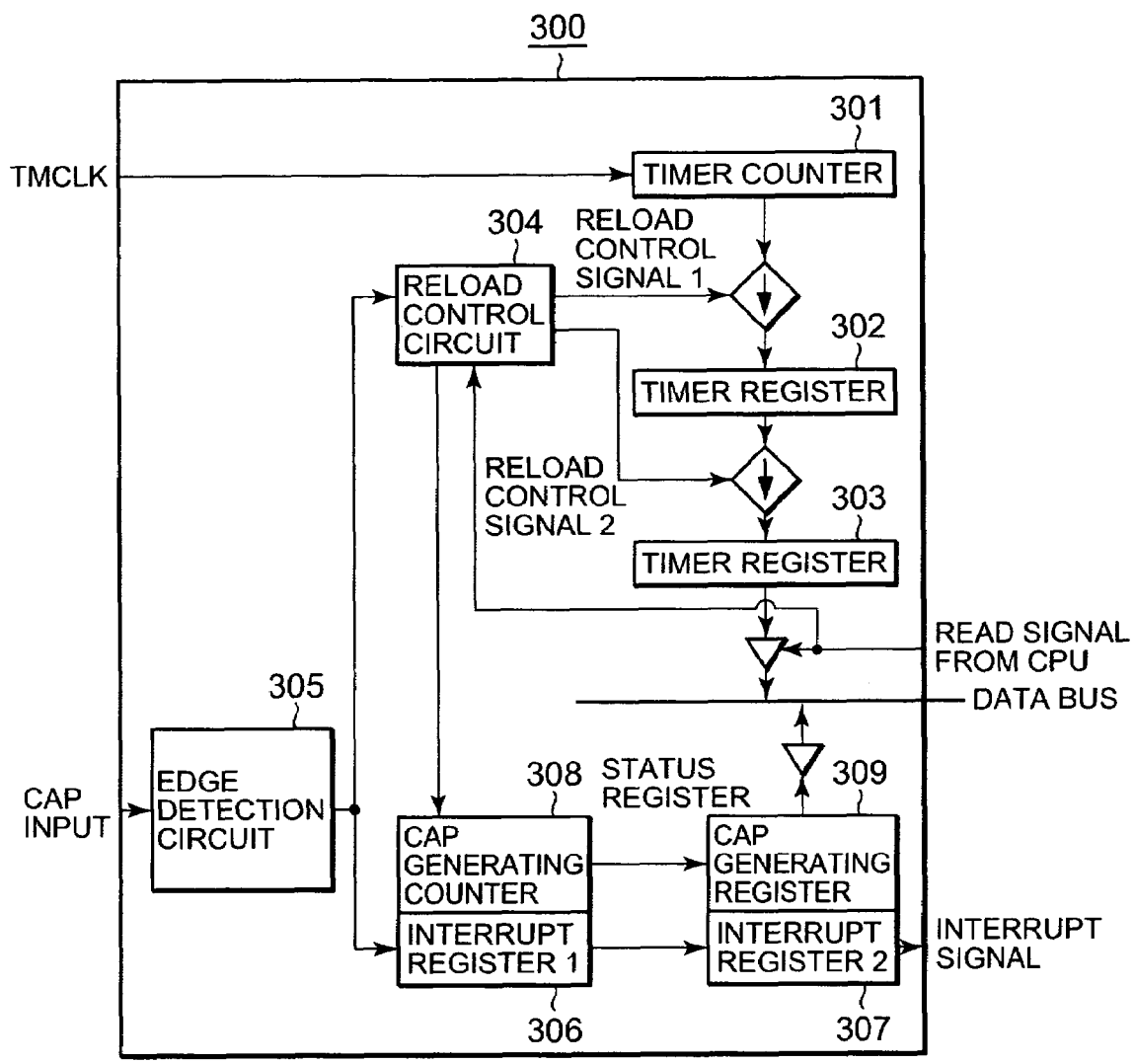
FIG. 5 is a block diagram of a capture timer according to a second embodiment.

FIG. 5 is a block diagram of a capture timer showing a second embodiment of the present invention. In the first embodiment, there may be cases in which, for example, time is taken long until the CPU reads the value of the timer register 203 after the generation of the first capture, and the second and subsequent captures are generated plural times. Therefore, the second embodiment is configured in such a manner that a capture (CAP) generating counter is added to a status register group in FIG. 5 and the number of captures subsequent to the generation of the first capture is left in the status register group. Incidentally, the capture generating counter includes a CAP generating counter 308 for performing counting in sync with a timer clock and a CAP generating register 309 for capturing the value of the CAP generating counter 308 in sync with a CPU clock. A reload control circuit 304 is a circuit similar to the reload control circuit employed in the first embodiment. The CAP generating counter performs counting in response to a reload control signal 1.

Figure 6:
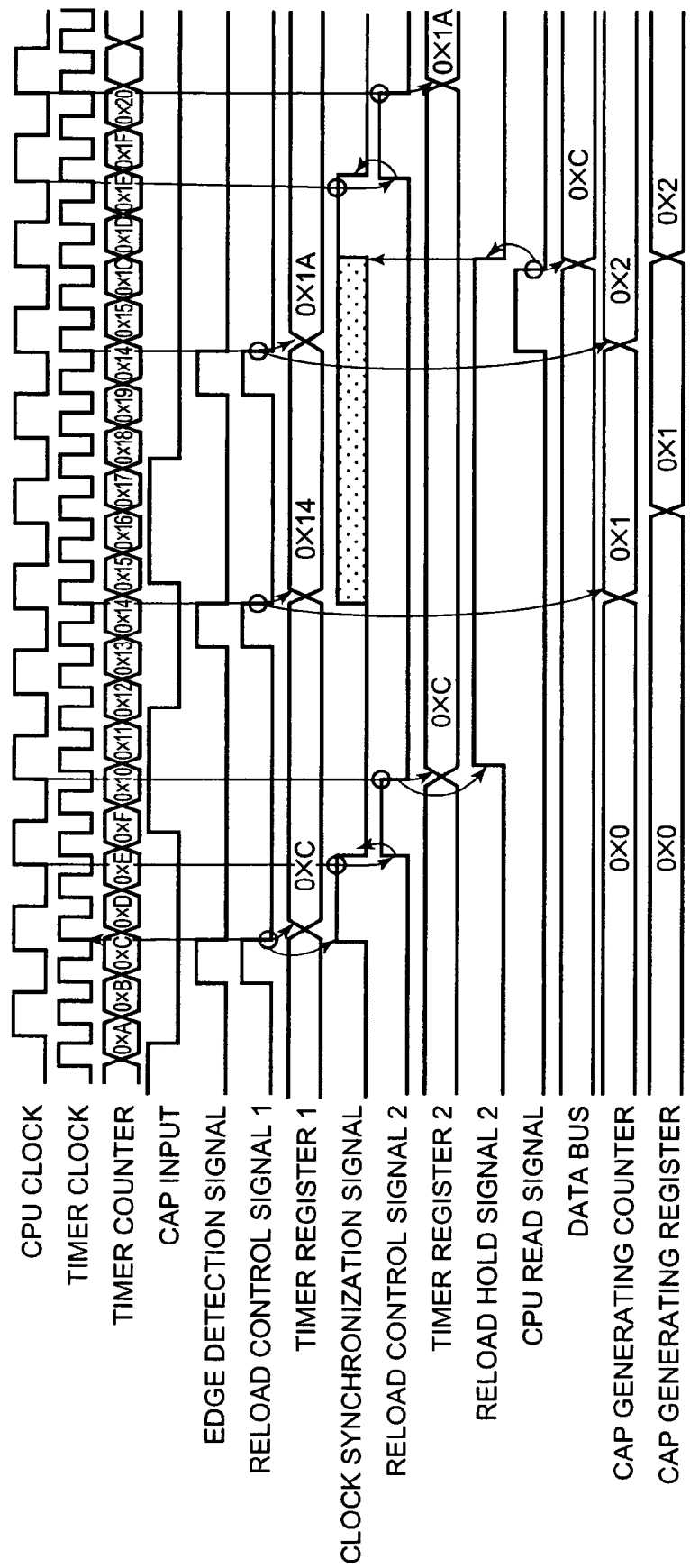
FIG. 6 is a time chart showing an example illustrative of cycle measurements of the capture timer according to the second embodiment.
Figure 7:
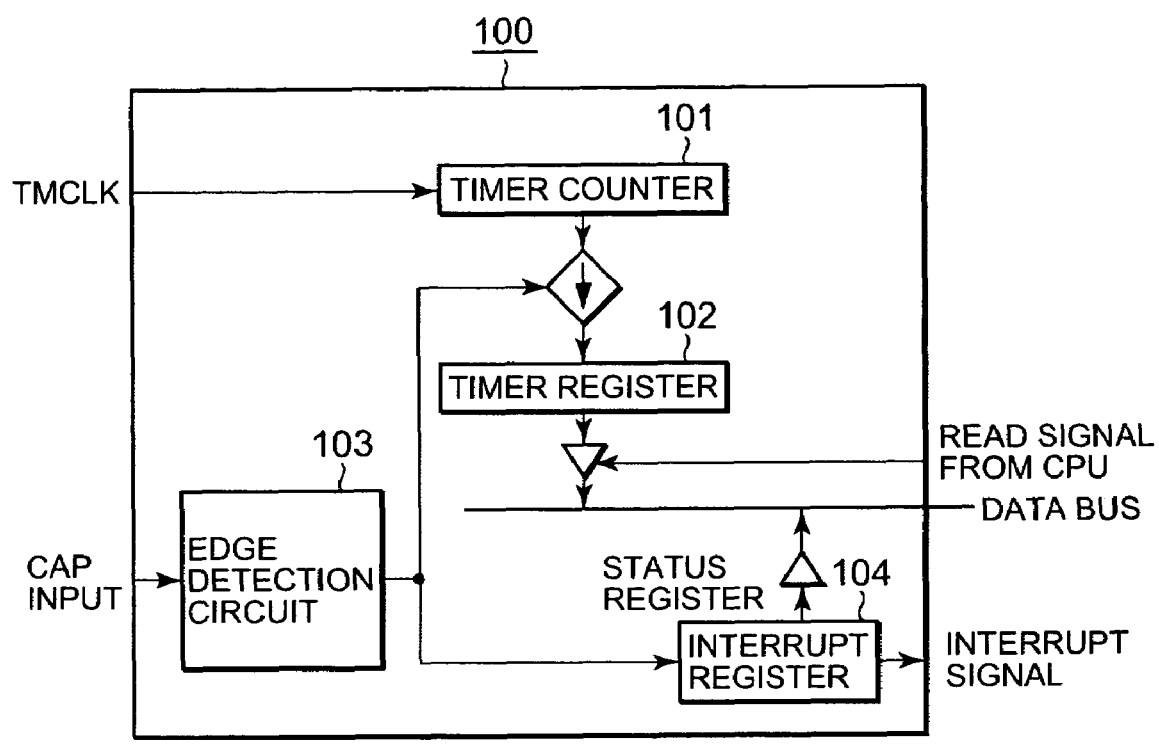
FIG. 7 is a block diagram of a conventional capture timer.
Figure 8:
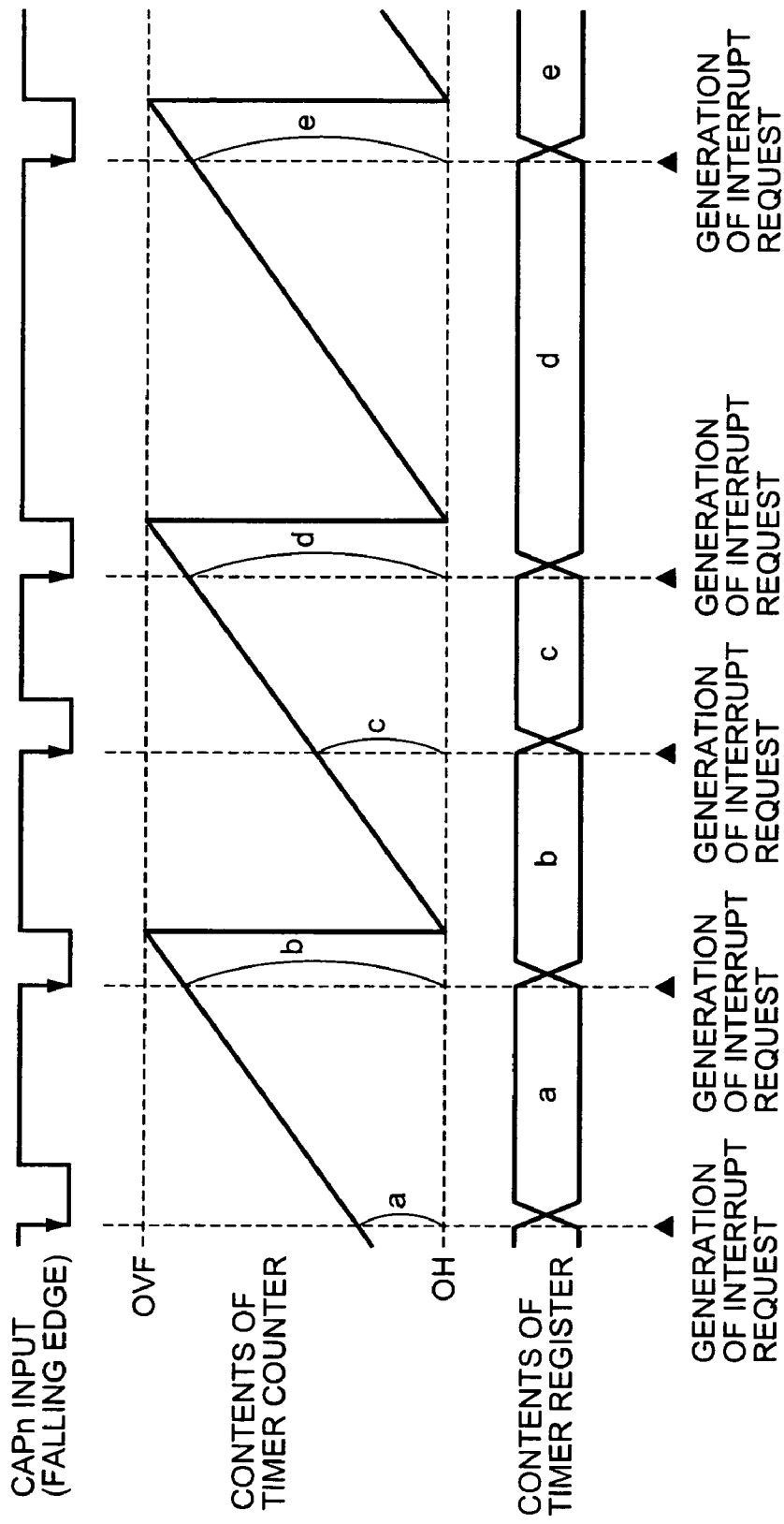
FIG. 8 is an operation explanatory diagram of the conventional capture timer.
Figure 9:
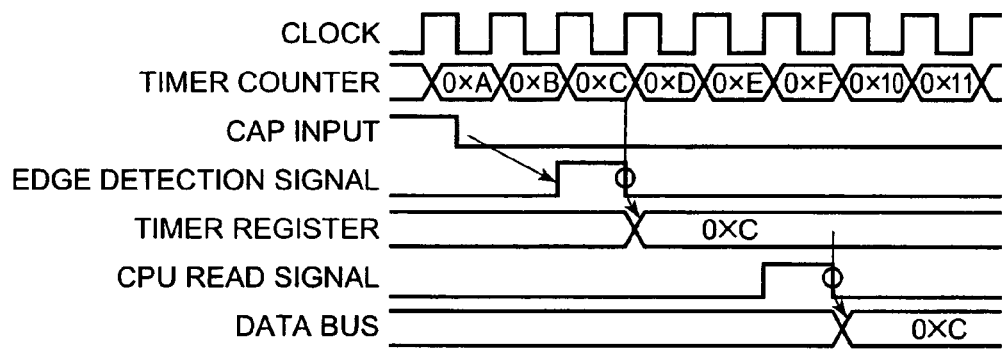
FIG. 9 is a time chart showing an operation of the conventional capture timer.
Figure 10:
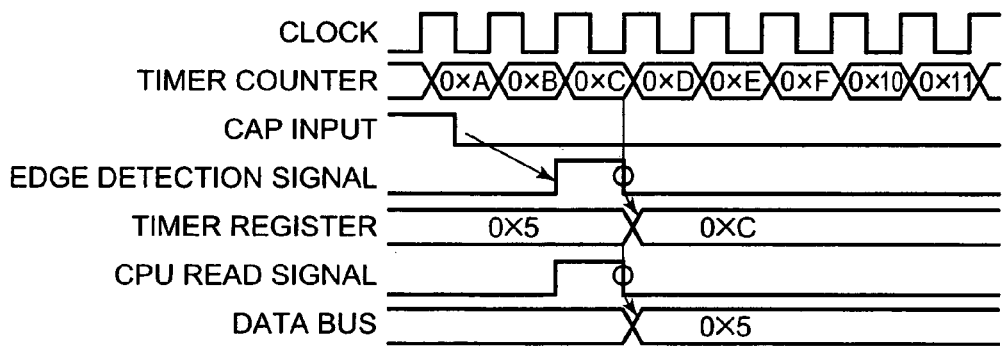
FIG. 10 is a time chart illustrating another operation of the conventional capture timer.
Figure 11:
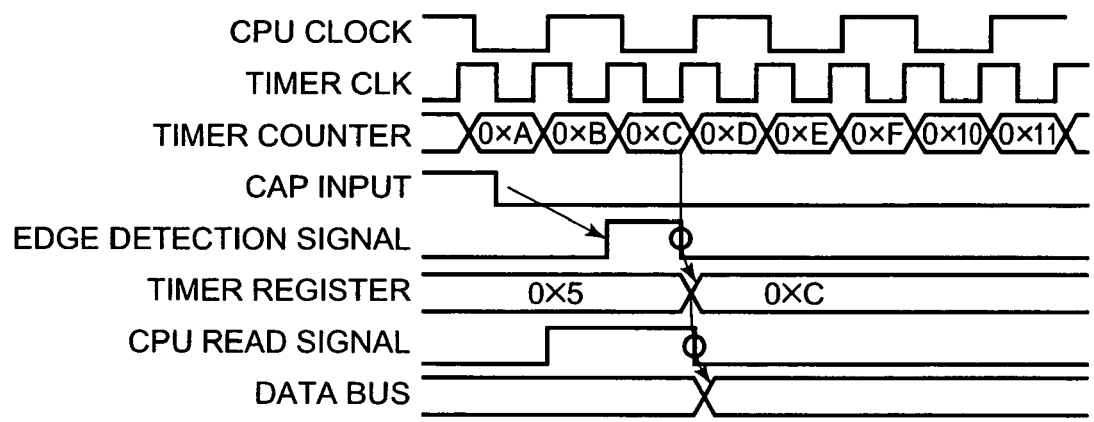
FIG. 11 is a time chart depicting a further operation of the conventional capture timer.

FIG. 6 is a time chart showing an example illustrative of cycle measurements by the capture timer of the second embodiment. When second and third captures occur after the generation of the first capture, the CAP generating counter 308 is counted UP in sync with the timer clock when a reload control signal 1 is generated during a period in which a reload hold signal 2 is being set. The CAP generating register 309 takes in the value of the CAP generating counter 308 in accordance with the CPU clock.

In FIG. 6, a value (O×1A) based on the generation of the third capture is finally left in the timer register 303. Therefore, the averaging of two capture intervals with respect to the captures generated three times results in (O×1A−O×C)÷ CAP counter value (O×2).

According to the second embodiment as described above, even when time is taken until the CPU reads the value of the timer register 303 after the occurrence of the capture, and a large number of captures occurs during that time, the CPU is capable of calculating the average value of once-capture intervals by computation by obtaining the value of the CAP generating register 309.

The present invention is applicable to a microcomputer (or system LSI) with a capture timer (input timer) built therein. In the timer counter and the timer register employed in the embodiment of the present invention, there is hardly any restriction on the number of bits and they may be configured as, for example, a 16-bit counter or a 32-bit counter depending on a capture cycle to be measured.

The CAP generating counter that indicates the number of occurrences of captures, is also similarly capable of changing bits according to application.

In the present invention, the detection of each capture is prohibited during the period in which the synchronization signal is being set, upon loading of data from the timer register to another timer register. However, when the capture occurs during this period, such a register as leave its information therein as Warning may be configured so as to be prepared in the status register group.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A microcomputer comprising:
   a timer circuit built therein, which is operated in accordance with a timer clock signal asynchronous with a CPU clock signal for operating a CPU, said timer circuit including,
   a timer counter which counts a generation interval of an external signal in sync with the timer clock;
   a first timer register which fetches therein a counted value of the timer counter in sync with the timer clock;
   a second timer register which fetches therein the value of the first timer register in sync with the CPU clock;
   an edge detection circuit which detects a change in the level of the external signal to thereby generate an edge detection signal; and
   a reload control circuit which outputs a first reload control signal for reloading the count value of the timer counter into the first timer register in sync with the timer clock in accordance with the edge detection signal, and outputs a second reload control signal for reloading the value of the first timer register fetched therein by the first reload control signal into the second timer register in sync with the CPU clock, and which holds the output of the second reload control signal where a second edge detection signal is generated during the interval from after the generation of a first edge detection, the CPU reads the contents of the second timer register, and outputs the second reload control signal after the CPU has read the contents of the second timer register.

2. A microcomputer comprising:

a timer circuit built therein, which is operated in accordance with a timer clock signal asynchronous with a CPU clock signal for operating a CPU, said timer circuit counting a generation interval of an external signal in sync with the timer clock signal, outputting an edge detection signal and a first reload control signal when a change in the level of the external signal is detected, setting the counted value to a first timer register in sync with the timer clock signal on the basis of the first reload control signal, setting an interrupt signal to a first interrupt signal and setting a clock synchronization signal thereto, resetting the clock synchronization signal when a second reload control signal synchronized with the CPU clock signal is generated from the clock synchronization signal, setting the value of the first timer register to a second timer register operated in sync with the CPU clock signal when the second reload control signal is invalid, and setting a reload hold signal for holding validation of the clock synchronization signal thereto, and when the operation of reading the contents of the second timer register from the CPU occurs based on an interrupt signal sent from a second interrupt register with an interrupt signal set thereto in sync with the CPU clock signal, resetting the reload hold signal and outputting the contents of the second timer register to a data bus.

3. The microcomputer according to claim 1, wherein the reload control circuit in the timer circuit is means which outputs a reload control signal indicative of the occurrence of the second edge detection signal and its subsequent edge detection signals each time the second and subsequent edge detection signals are generated, during the interval from after a first edge detection occurs, the CPU reads the contents of the second timer register, and wherein the timer circuit further includes a counter which counts the number of occurrences of the reload control signal in sync with the timer clock, and a register which takes therein a count value of the counter in sync with the CPU clock.

4. The microcomputer according to claim 1, wherein when a second external signal and its subsequent external signals are generated during a period up to reading of the contents of the second timer register by the CPU, the number of occurrences thereof is counted, and after completion of second reading of the second timer register by the CPU, the average value of the generation intervals of the external signals is calculated based on the value of a difference between the contents of the second timer. register and the number of said occurrences.

* * * * *